(12) United States Patent
Malkin et al.

(10) Patent No.: US 7,447,598 B2
(45) Date of Patent: Nov. 4, 2008

(54) METHODS AND SYSTEMS FOR AUTOMATICALLY ASSESSING AND REPORTING STRUCTURAL HEALTH

(75) Inventors: Matthew C. Malkin, Seattle, WA (US); Justin D. Kearns, Seattle, WA (US)

(73) Assignee: Theo Boeing Company, Chicago, IL (US)

( * ) Notice: Subject to any disclaimer, the term of this patent is extended or adjusted under 35 U.S.C. 154(b) by 0 days.

(21) Appl. No.: 11/668,898

(22) Filed: Jan. 30, 2007

(65) Prior Publication Data

US 2008/0183402 A1    Jul. 31, 2008

(51) Int. Cl.
*G06F 3/00*    (2006.01)
(52) U.S. Cl. ................... 702/35; 702/34; 702/190; 702/191
(58) Field of Classification Search ............. 702/27, 702/35, 106, 113, 156, 182, 34, 190, 191; 73/865; 340/870.11; 705/30; 345/12, 40, 345/616
See application file for complete search history.

(56) References Cited

U.S. PATENT DOCUMENTS 5,455,777 A * 10/1995 Fujiyama et al. ............. 702/34
7,069,158 B2 * 6/2006 Gidwani ...................... 702/56
7,286,964 B2 * 10/2007 Kim .......................... 702/183
2005/0279171 A1   12/2005 Kollgaard et al.

OTHER PUBLICATIONS

Palmer et al, "Augmented Data Interpretation System", Section 5 of Structural Repair of Aging Aircraft report dated Sep. 2001, pp. 150-170.

* cited by examiner

*Primary Examiner*—Eliseo Ramos-Feliciano
*Assistant Examiner*—Felix Suarez
(74) *Attorney, Agent, or Firm*—Lee & Hayes, PLLC

(57) ABSTRACT

Structural analysis systems and methods are disclosed. One embodiment provides a method for analyzing a structure includes receiving damage image data; converting the received image data into analysis data in an analyzable format; performing a structural analysis on the analysis data; and outputting the results of the structural analysis. The system includes a computer or other processing device that is capable of analyzing a structure. The system receives damage image data; converts the received image data into analysis data in an analyzable format; performs a structural analysis on the analysis data; and outputs the results of the structural analysis.

17 Claims, 8 Drawing Sheets

US 7,447,598 B2

METHODS AND SYSTEMS FOR AUTOMATICALLY ASSESSING AND REPORTING STRUCTURAL HEALTH

BACKGROUND OF THE INVENTION

1. Field of the Invention

The invention relates to methods used to assess and report structural health and, more particularly, to methods used to automatically assess and report structural health.

2. Description of the Related Art

As a structure (e.g., an aircraft, building, truck, etc.) ages or as repairs to the structure age, non-destructive evaluation may be performed to verify the health of the structure and to confirm that the structure has sufficient remaining strength for continued operations. Structural damage data (e.g., data from non-destructive evaluation) must be interpreted in order to assess the health of a structure. Present technology requires that an operator (a person) interpret this data. Errors can arise due to manual collection and interpretation of the data, leading to errors in assessment of the health of a structure.

Variability exists when data from non-destructive inspection of structural components is interpreted manually. For any given structural inspection task, the probability of detection (PoD) is affected by several factors. These factors include: 1) the skill and experience of the inspector, 2) accessibility to the structure, 3) exposure of the inspection surface, and 4) confounding attributes such as underlying structure or the presence of rivets. This variation can cause missed flaws (false negatives) and over-reported flaw sizes (false positives). One source of the variation is the manual interpretation of inspection data.

Costs associated with false negatives and false positives have the potential to be high. At present, very conservative structural design is one way of managing the uncertainty surrounding inspection data. When these concepts are applied to bonded structural repairs, allowable damage limits (flaw sizes) for bonded repairs can be tied to inspection system capabilities and made to be so conservative that the benefit of the repair is not realized.

Consequently, present structural inspections require a combination of sophisticated equipment and operator experience and knowledge to obtain an assessment of structural health. Errors in the assessment of structural health may have undesirable economic consequences.

Due in part to these consequences the "Ramp Damage Checker" (disclosed in US 2005/0279171) was developed for the airline industry. This device determines if the structure has hidden damage. However, the impact of the detected damage on the structural strength is not determined.

Other attempts at combining non-destructive inspection (NDI) data and analysis have been made. The Structural Repair of Aging Aircraft (SRAA) program provides an example of this concept (Contract awarded to Boeing by the Air Force Research Laboratory, contract no. F33615-98-2-5113). The method used by the SRAA program was to modify a structural model based on NDI data. The model modifications were performed manually by the operator aligning the NDI data with the existing structural model.

Accordingly, there is a need for a method to automatically assess and report structural health.

BRIEF SUMMARY OF THE INVENTION

The present invention addresses the problems identified above by providing methods to automatically assess and report structural health. Embodiments of the invention may advantageously reduce the costs and improve the accuracy of structural inspections and health assessments in comparison with the prior art methods.

One embodiment provides a method for analyzing a structure that includes receiving damage image data; converting the received image data into analysis data in an analyzable format; performing a structural analysis on the analysis data; and outputting the results of the structural analysis.

Another embodiment is a system for analyzing a structure that includes a computer or other processing device that is capable of analyzing a structure. The system receives damage image data; converts the received image data into analysis data in an analyzable format; performs a structural analysis on the analysis data; and outputs the results of the structural analysis.

A further embodiment provides a computer-based method for analyzing a structure. This method includes: receiving image data of a portion of the structure into a processing component; comparing the received damage image data with reference image data using the processing component; denoising the received image data based on the comparison of the received image data and the reference image data using the processing component; automatically identifying one or more anomaly boundaries from the denoised image data using the processing component; automatically creating an analysis geometry based on the identified one or more anomaly boundaries using the processing component; automatically creating an analysis mesh based on the created analysis geometry using the processing component; automatically performing finite element analysis on the created analysis mesh using the processing component; comparing the finite element analysis results with allowable results; calculating the residual strength of the structure; determining if the structure is suitable for continued service based on at least one of: the results of the finite element analysis; the results of comparing the finite element analysis results with allowable results, and the results of calculating the residual strength of the structure; and outputting the results of the determination of structural suitability for continued service.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

The accompanying drawings incorporated in and forming part of the specification illustrate several aspects of the present invention. In the drawings.

Reference will now be made in detail to embodiments of the invention, examples of which are illustrated in the accompanying drawings.

DETAILED DESCRIPTION

Automated assessment of inspection system data has the potential to increase the probability of detection for non-destructive inspection (NDI) systems, which in turn may enable modification of allowable damage limits (flaw sizes) and thereby reduce the design weight of structures designed for damage tolerance. Automated assessment of NDI data may provide benefits to any industry that uses NDI data, for example the construction and repair of: airplanes, cars, trains, buildings, bridges, pressure vessels, ships, etc.

The potential also exists to reduce inspection costs through automated assessment of structural health. The automated assessment may be made possible (in part) by the use of in-situ sensing systems. When compared to off-board sensors, in-situ sensors are not subject to variation due to manual operation of a sensing element. Automated assessment is intended to improve over manual interpretation by improving probability of detection, reducing false positives and negatives, and decreasing costs of inspection.

Figure 1:
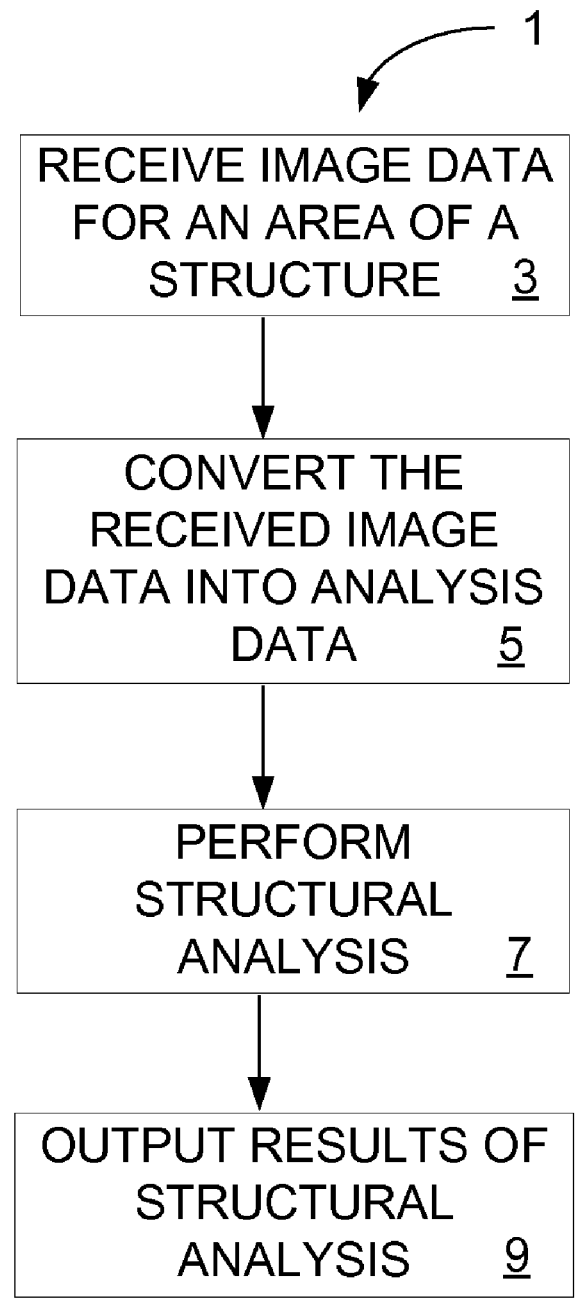
FIG. 1 illustrates of a flow chart of one method that may be used to assess a structure.
Figure 2:
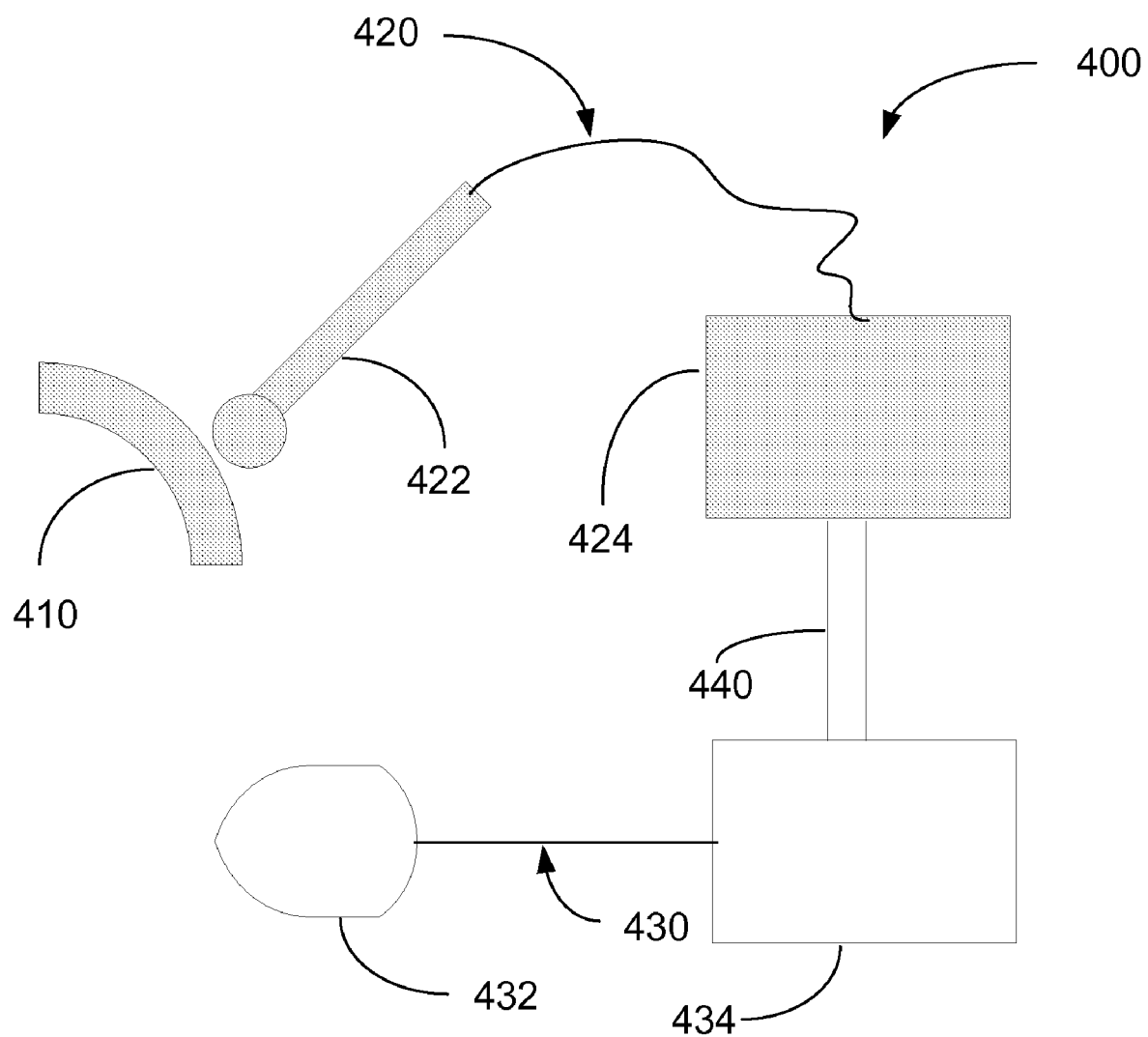
FIG. 2 illustrates one embodiment of a system that may be used to detect defects in a structure and then analyze the detected defects.

FIG. 1 illustrates one embodiment of a process to determine the health of a structure 410, an example of which is shown in FIG. 2. In process 1, image data for an area of structure 410 is received at block 3. The image data may be received by a structure analysis system 430 from a sensing system 420 through a dedicated or network (wired or wireless) connection 440 as illustrated in FIG. 2. Alternatively, the image data may be transferred from the sensing system 420 to analysis system 430 by an operator, or by any other suitable method or means.

Data interpretation may be performed by converting image data into an analyzable format (a finite element mesh is one example of the analyzable format) at block 5. A structural analysis of the converted data may be performed at block 7. The results of the structural analysis may be output at block 9. Some embodiments may omit the data conversion (block 5) if the data input is in a form compatible with the structural analysis of block 7.

FIG. 2 illustrates one embodiment of a system 400 that may be used to determine or monitor the health of the structure 410. The system 400 includes the structure analysis system 430. In some embodiments, system 400 may also include the sensing system 420.

The structure analysis system 430 may include a general purpose computer 434, as is well known in the art or developed in the future, running software. Alternatively, the analysis system 430 may be a dedicated device using software, firmware, a combination of software and firmware, etc. The analysis system 430 performs the structural analysis based on the data input and outputs the results of the structural analysis. In some embodiments, the analysis system 430 may also convert the image data received from the sensing system 420 into a format used to perform the structural analysis. In other embodiments, the sensing system 420 may output the data in a format that can be used for structural analysis without conversion.

In one embodiment, the computer 434 may be connected to a display 432. In other embodiments, the computer 434 may be connected to a printer or other output device (not shown).

Some embodiments may include a sensing system 420. The sensing system 420 typically includes a sensor 422 and an image processor 424. In some embodiments the image processor 424 may be integrated into the sensor 422. Alternatively, in other embodiments the image processor 424 may be integrated in to the analysis system 430. In further embodiments, the sensing system 420 may be integrated into the analysis system 430.

In some embodiments, the sensor 422 may be a hand-operated or hand-held sensor. The operator using the sensor may mark on the structure 410 the locations of structural defects. After determining the size and location of each defect, the operator could obtain an image and location of the defect. In one embodiment, the operator could take a picture of the area that included the defect or anomaly. In another embodiment, the position of the sensor 422 may be recorded, thus the sensing system 420 could output an image. In further embodiments, the sensor 422 may contain a plurality of sensing elements at predetermined locations on the sensor 422, thus the sensing system 420 could create an image of the area scanned.

The image would then be input into the analysis system 430. If the image were an electronic image, then the electronic image may be input into the analysis system 430. Alternatively, if the image were a paper or film image, then the image may be scanned to an electronic (analog or digital) image format for input to the analysis system 430.

In other embodiments the sensor 422 may be a robotic sensor or sensors, as are well known in the art. For example, the sensor 422 may be coupled to one or more automated scanning systems of the type generally used by the AUTOMATED ULTRASONIC SCANNING SYSTEM® (AUSS), and by the MOBILE AUTOMATED SCANNER® (MAUS), which systems are operated and commercially available from The Boeing Company of Chicago, Ill. The robotic sensor would automatically or semi-automatically scan a desired portion of the structure 410, and provide an image of the defect that could be input into the analysis system.

In further embodiments, the sensor 422 may be one or more sensors embedded in or attached to the structure (an in-situ sensor or sensor system). The in-situ sensor or sensor system would provide an image of the defect that could be input into the analysis system.

As is well known in the art, the sensor 422 may operate in the acoustic or electro magnetic spectrum. Thus, in one embodiment, sensor 422 may be an ultrasound sensor. In other embodiments, sensor 422 may be an X-ray or microwave sensor. In further embodiments sensor 422 may be an infrared or ultraviolet sensor, or even a visible wavelength sensor.

Figure 3:
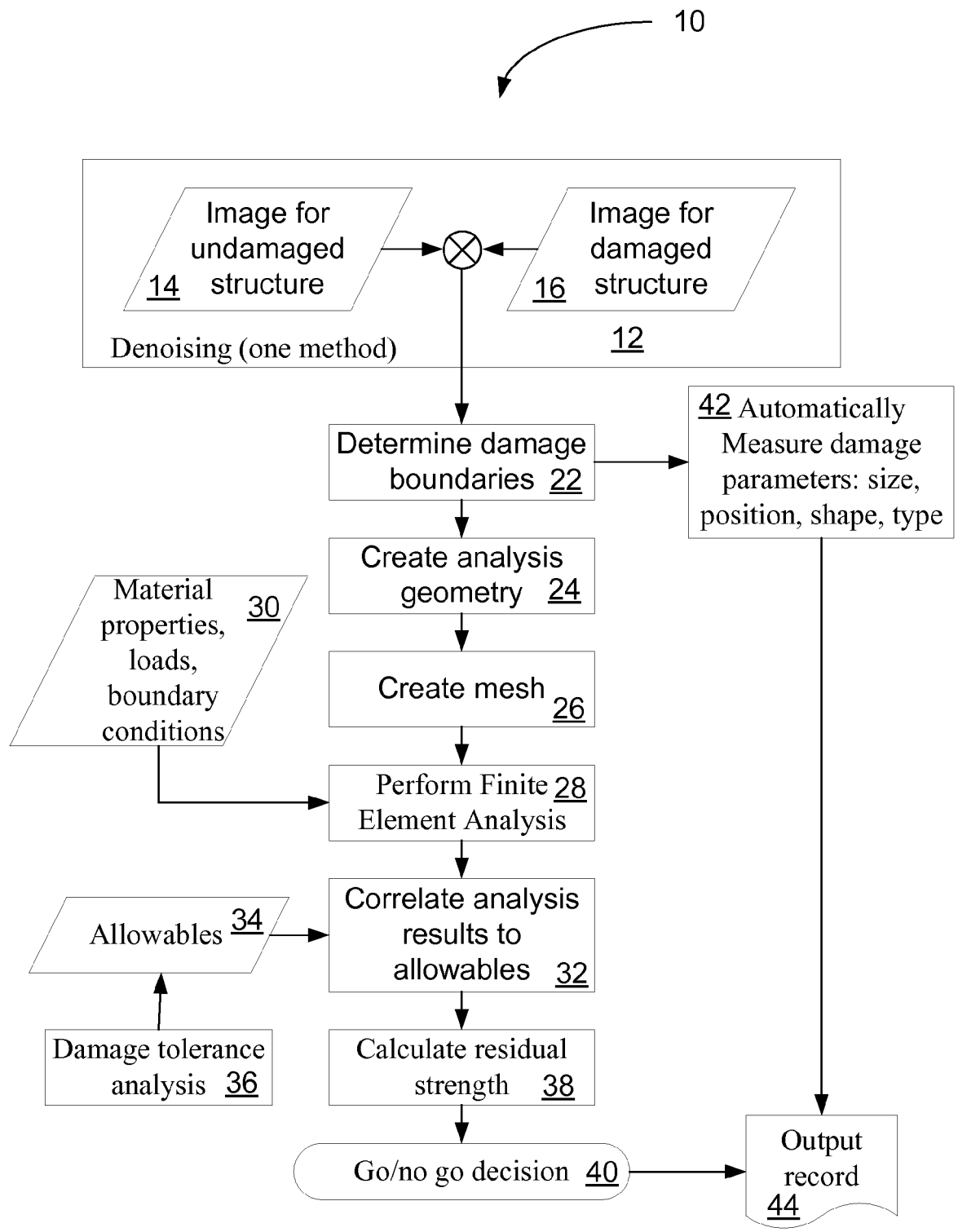
FIG. 3 illustrates of a flow chart of a second method that may be used to assess a structure.
Figure 4:
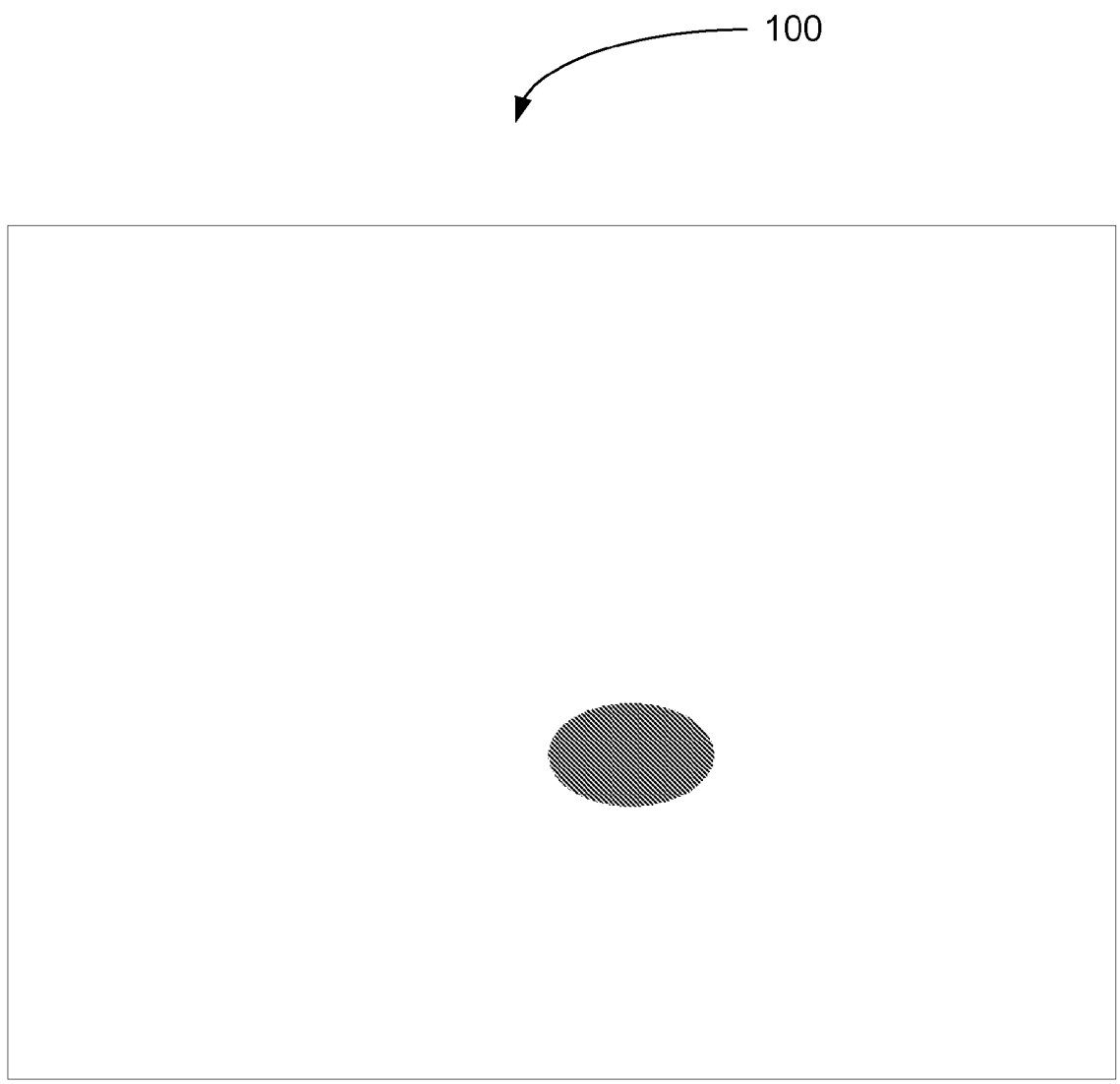
FIG. 4 illustrates an exemplary image showing an elliptical defect or anomaly.

The process flow for a second embodiment 10 is shown in FIG. 3. In this embodiment, the process 10 may determine structural health (residual strength) based on sensed data (images of structural damage). In one embodiment, a widely-known program known as MATLAB® (commercially available from The MathWorks, Inc. of Natick, Mass.) is used to process the images and calculate the residual strength value. In other embodiments, other programming environments may be used. In one embodiment, software was developed to take an image from sensors that detect defects in a structure (structural health monitoring sensors) and produce an analysis of the structure represented by that image. As a 2-dimensional example, an image of a single anomaly with an arbitrary boundary in a uniform field may represent the output of a health monitoring sensing system. A generic image 100 shown in FIG. 4 is one example of image data that may be provided as an input to the process 10 illustrated in FIG. 3.

In one embodiment, process 10 may be denoise the input image in optional block 12. One denoising method would compare an image with an anomaly, for example image 100 input in block 16 with another image without the anomaly input in block 14. By using both images the accuracy of the final result is improved because noise, for example rivets, fasteners, paint boundaries, etc. (areas that may show up as an anomaly, but do not reflect structural problems), is removed prior to or as part of the structural analysis.

In one embodiment, the image may be converted into data that can be used for structural analysis using blocks 22, 24, and 26. In other embodiments, this conversion may not be required.

In block 22 the damage boundaries are determined based on the input image. Based on the damage boundaries determined in block 22, an analysis geometry may be created in block 24, and the damage parameters may be measured in block 42. The damage parameters computed in block 42 may include, but are not limited to, size, position, shape or type.

Figure 5:
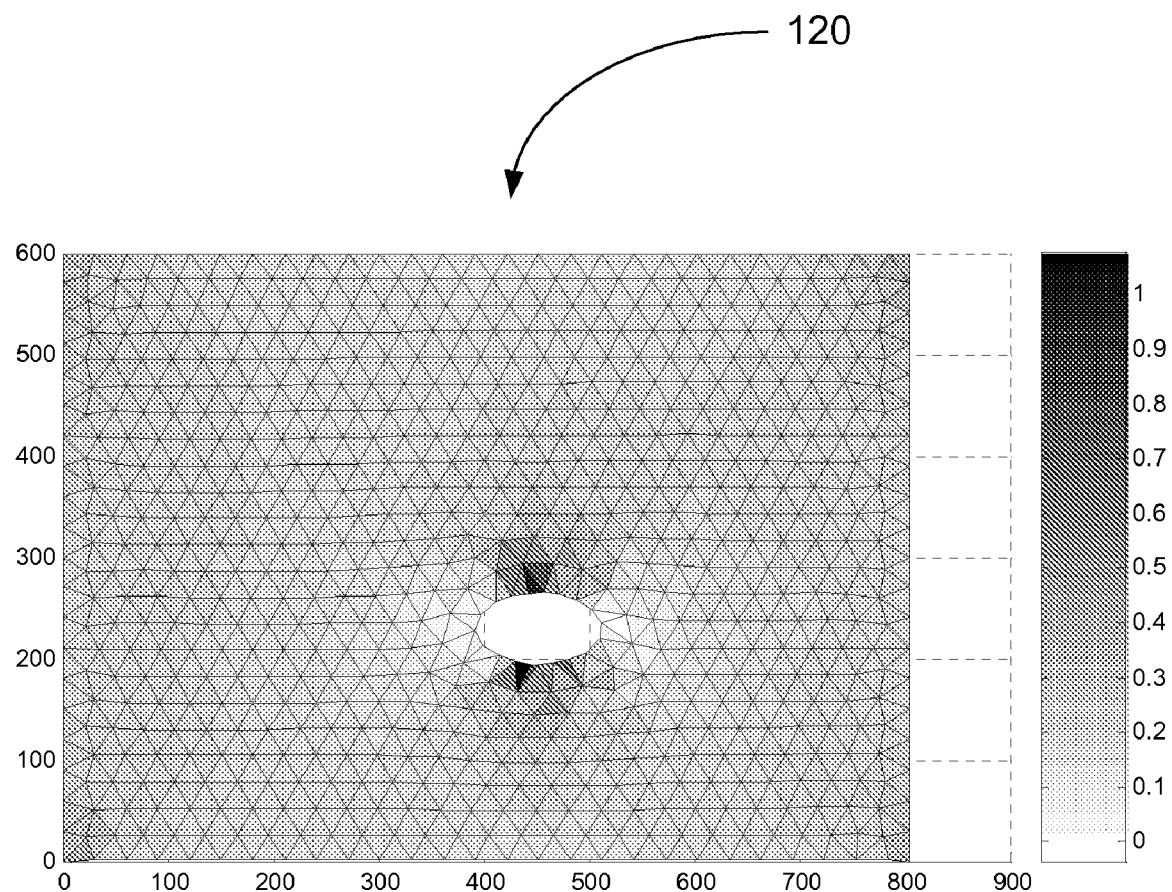
FIG. 5 shows an exemplary analysis of the anomaly shown in FIG. 4 with a basic displacement boundary condition and normalized material properties.
Figure 6:
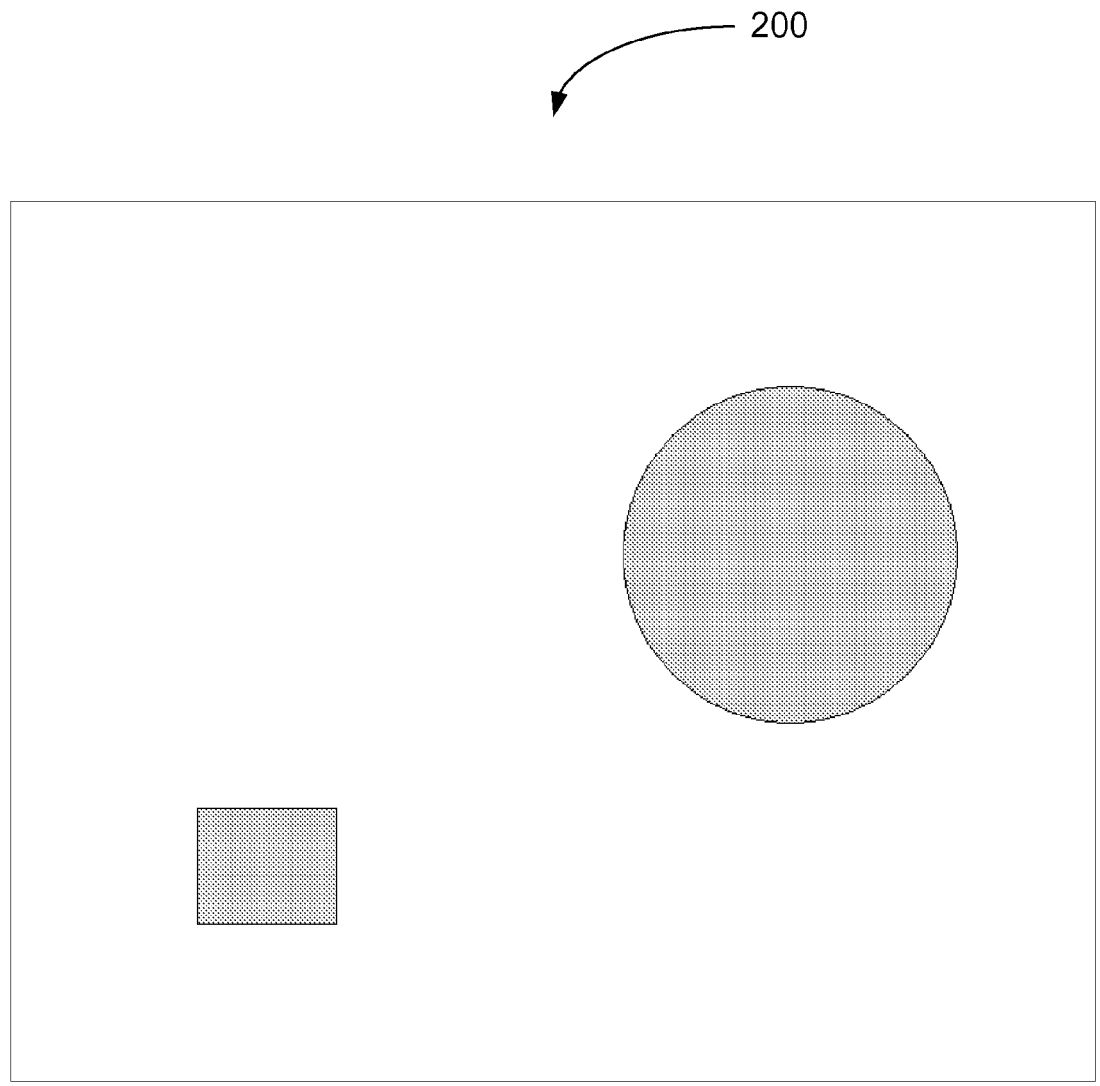
FIG. 6 illustrates an exemplary image with two anomalies of different shapes that may be input for analysis.
Figure 7:
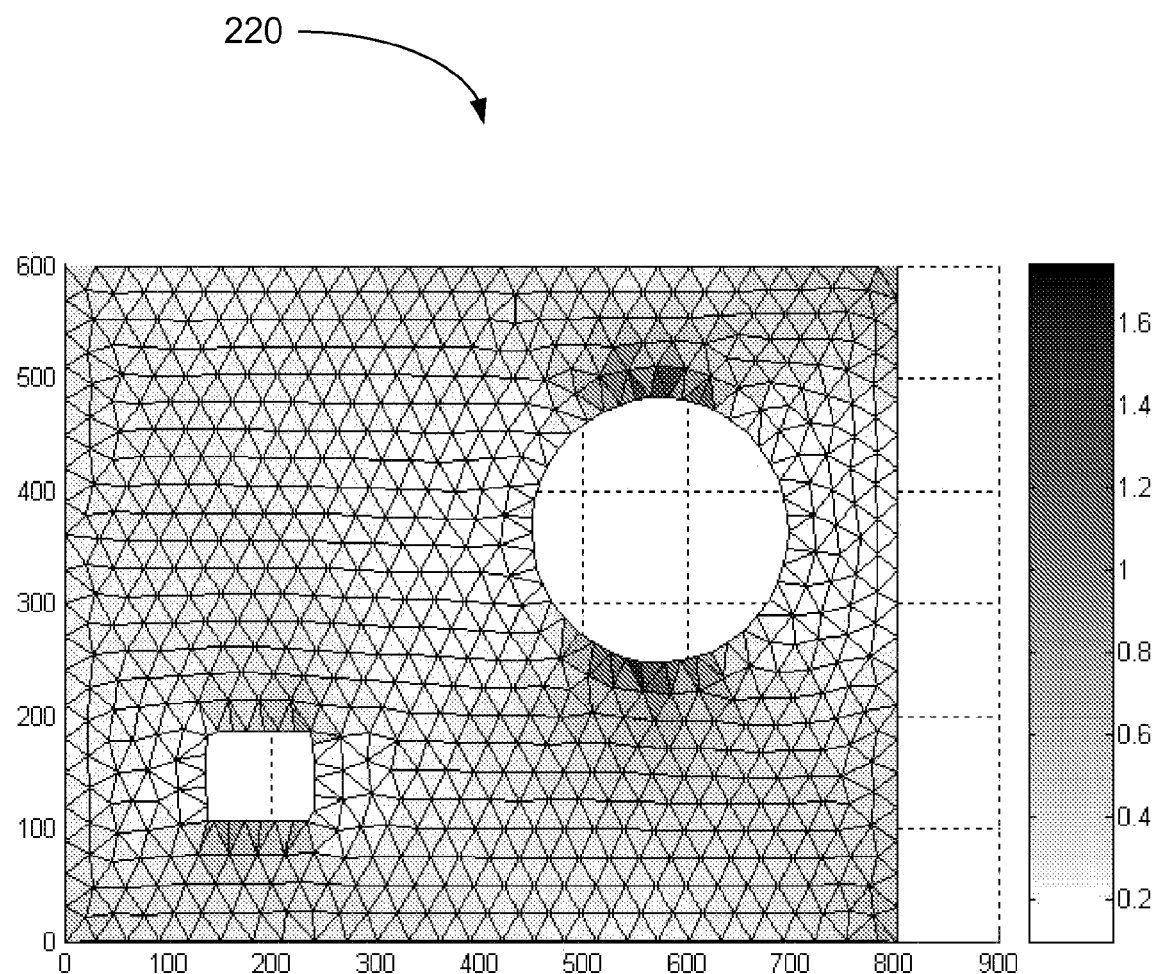
FIG. 7 shows an exemplary analysis of the anomaly shown in FIG. 6.

Based on the analysis geometry created in block 24, a mesh may be created in block 26. The mesh may be any geometry formed from a configuration or system of nodes interconnected with one or more lines. In some embodiments, the mesh may be a finite element mesh. One example of a finite element mesh that may be created is mesh 120 shown in FIG. 5. Mesh 120 is one example of a finite element mesh that may be created based on the input of image 100 shown in FIG. 4. A second example of a finite element mesh that may be created is mesh 220 shown in FIG. 7. Mesh 220 is an example of a finite element mesh that may be created based on the input of image 200 shown in FIG. 6. In other embodiments, the mesh may be an interconnected or intersecting configuration or system of nodes and lines used in structural analysis.

Thus, the region around the anomaly shown in the input image 100 may be automatically converted to a mesh using blocks 22, 24, and 26. Similarly, multiple anomalies as illustrated in image 200 can also be meshed in the same manner.

After the input image is prepared for analysis in blocks 22, 24, 26, a structure finite element model of the region may be created and analyzed in block 28. When the finite element model is subjected to loads and boundary condition, a strain field is produced, which can then be analyzed. If the anomalies represent damage, the analysis can be used to determine the residual strength of the structure.

In one embodiment, material properties, design or expected loads, and boundary conditions are provided in block 30 to the finite element analysis or finite element model (block 28). In other embodiments, the material properties, design or expected loads, and boundary conditions may be contained within the finite element model or analysis.

In one embodiment (not shown) the damage parameters calculated in block 42 may be input into block 28 and/or block 32.

In some embodiments the output of the finite element analysis of block 28 may be compared to or correlated with allowed damage in block 32. The allowed damage used in block 32 may be developed using a damage tolerance analysis in block 36. The output of the damage tolerance analysis may be input via an allowables input block 34 into block 32.

The comparison performed in block 32 could take a variety of forms. For example, a scalar maximum strain value could be calculated from the analysis and compared to a single allowable strain number from a design manual, a design guide, or a table created by previous test results and statistical analysis.

In some embodiments the residual strength of the structure may be calculated in block 38 based on the output of either block 32 or block 28.

Figure 8:
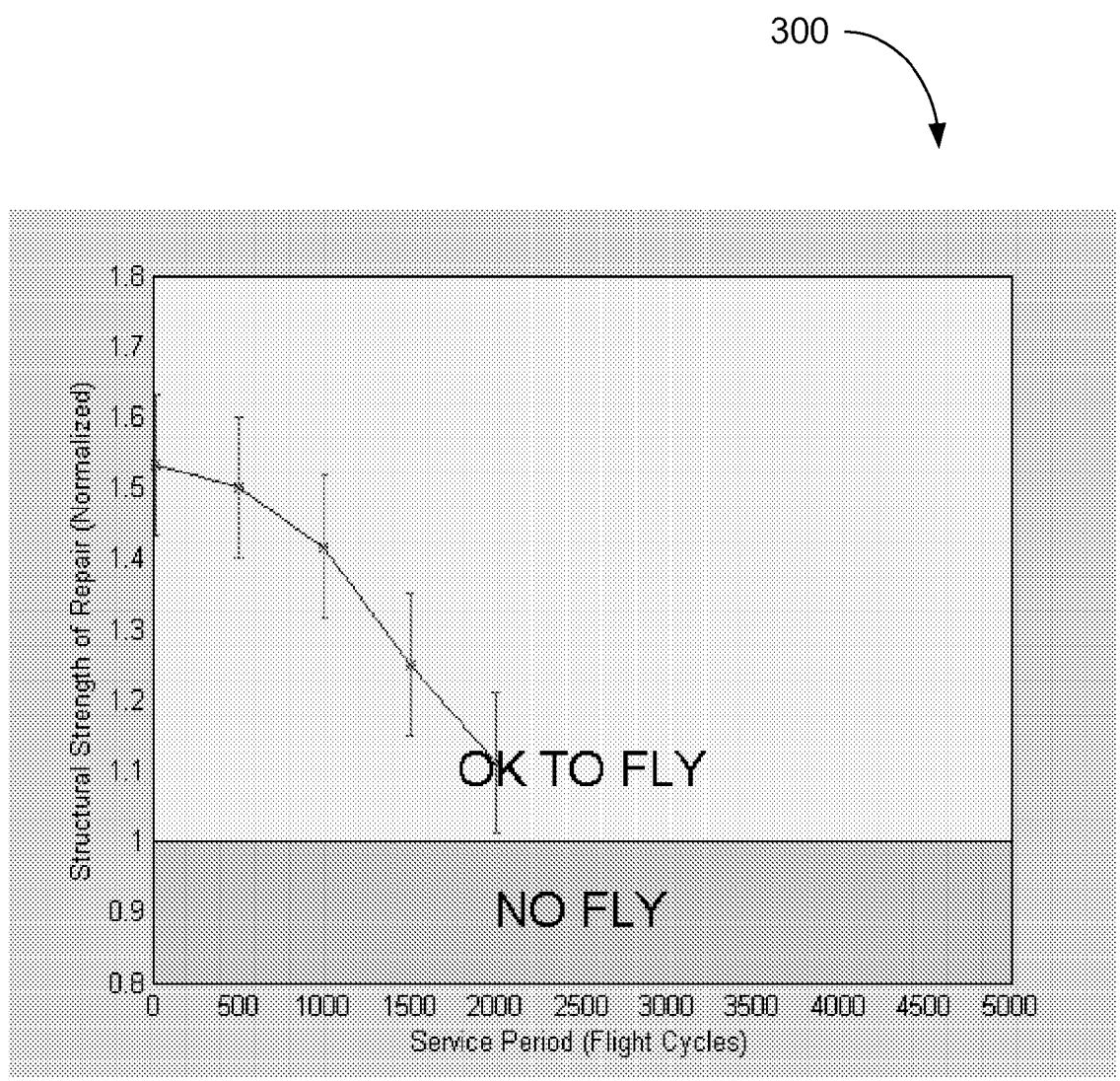
FIG. 8 illustrates one embodiment of a graph of damaged repair strength over time showing how a go/no-go determination could be made.

With allowable damage limits established, decisions about the health of the structure can now be made based on the relative magnitude of the pre-anomaly structure and post-anomaly stress analysis. In some embodiments a go/no go decision regarding the continued use of the structure or component may be made in block 40. As a decision aid, a graphical representation of the acceptability of the structure, and the resulting effect on future use, may be produced and output in some embodiments. FIG. 8 provides graph 300 which is an example of such a graphical representation. Graph 300 is based on the needs of the aviation industry and thus plots structural strength of the repair on one axis and the number of flight cycles on the other axis. Thus, graph 300 informs the user or operator of the remaining usable life of the structure of component thereof.

Returning to FIG. 3, in block 44 the results may be output. This output may include one or more of the results of the structural analysis in block 28, the correlation of block 32, the residual strength of block 38, the go/no go decision of block 40, and/or the damage parameters of block 42.

An exemplary output from the analysis may be as follows:

| A total of 2 anomaly/anomalies has/have been found. | | | |
| --- | --- | --- | --- |
| Anomaly # | Area | Centroid X | Centroid Y |
| 1 | 2.00 | 0.84 | 4.56 |
| 2 | 5.71 | 1.47 | 3.65 |

In one particular embodiment, the process 10 may be created using portions of the MATLAB®, code provided in Alberty, J., Carstensen, C., Funken, S. A., and Klose, R., "Matlab-Implementation of the Finite Element Method in Elasticity," 2000, and a mesher developed and described in Persson, P., Strang, G., "A Simple Mesh Generator in Matlab". Some of the subroutines used in the process 10 are MATLAB functions either from standard MATLAB or from MATLAB's Image processing toolbox. Meshgrid, distmesh2D, and fixmesh are subroutines that create a finite element mesh, and fem_lame2D analyzes the mesh.

In summary, numerous benefits are described which result from employing the concepts of the invention. The foregoing description of an exemplary embodiment of the invention is presented for the purposes of illustration and description. It is not intended to be exhaustive or to limit the invention to the precise form disclosed. Obvious modifications or variations are possible in light of the above teachings. The embodiment was selected and described in order to best illustrate the principles of the invention and its practical application to thereby enable one of ordinary skill in the art to best utilize the invention in various embodiments and with various modifications as are suited to particular uses contemplated. It is intended that the scope of the invention be defined by the claims appended hereto.

We claim:

1. A method for automatically analyzing a structure comprising:
    receiving damage image data into a processing component;
    comparing the received damage image data with undamaged image data for the structure;
    denoising the received damage image data based on the comparison of the received damage image data and the undamaged image data so as to derive denoised image data;
    automatically converting the denoised image data into analysis data in an analyzable format with the processing component and without operator intervention, the automatically converting including automatically identifying one or more damage boundaries from the denoised damage image data with the processing component;

performing a structural analysis on the analysis data in the processing component; and outputting the results of the structural analysis from the processing component.

2. The method of claim 1 wherein the analyzable format is a finite element mesh.

3. The method of claim 1, wherein converting the denoised image data into analysis data in an analyzable format comprises:

automatically creating an analysis geometry based on the identified one or more damage boundaries with the processing component; and automatically creating an analysis mesh based on the created analysis geometry with the processing component.

4. The method of claim 3, wherein performing the structural analysis on the analysis data comprises:

performing finite element analysis on the created analysis mesh.

5. The method of claim 4, wherein performing the structural analysis on the analysis data further comprises:

comparing the finite element analysis results with allowable results.

6. The method of claim 5, wherein performing the structural analysis on the analysis data further comprises:

calculating the residual strength of the structure.

7. The method of claim 6, wherein performing identifying one or more damage boundaries from the denoised damage image data further comprises:

measuring and outputting damage parameters.

8. The method of claim 6, further comprising:

determining if the structure is suitable for continued service based on at least one of: the results of the finite element analysis; the results of comparing the finite element analysis results with allowable results, or the results of calculating the residual strength of the structure.

9. A system for analyzing a structure comprising:

a receiver that receives damage image data into a processing component, receiver including an image comparer that compares the received damage image data with undamaged image data, the receiver also including a denoiser that denoises the received damaged image data based on the comparison of the received damage image data and the undamaged image data so as to derive denoised image data;

a converter that automatically converts the denoised image data into analysis data in an analyzable format, an analyzer that automatically performs a structural analysis on the analysis data; and a display or printer configured to output the results of the structural analysis.

10. The system of claim 9, wherein the converter comprises:

an identifier that automatically identifying one or more damage boundaries from the received damage image data;

a geometry creator that automatically creates an analysis geometry based on the identified one or more damage boundaries; and a mesher that automatically creates an analysis mesh based on the created analysis geometry.

11. The system of claim 10, wherein the analyzer comprises:

a finite element analyzer that performs finite element analysis on the created analysis mesh.

12. The system of claim 11, wherein analyzer further comprises:

a results comparer that compares the finite element analysis results with allowable results.

13. The system of claim 12, wherein analyzer further comprises:

a calculator that calculates the residual strength of the structure.

14. The system of claim 13, wherein the identifier further comprises:

a measurer that measures and outputs damage parameters.

15. The system of claim 13, further comprising:

a continued service determiner that determines if the structure is suitable for continued service based on at least one of: the results of the finite element analysis; the results of comparing the finite element analysis results with allowable results, or the results of calculating the residual strength of the structure.

16. The system of claim 9, wherein the analyzable format is a finite element mesh.

17. A computer-based method for analyzing a structure, comprising:

receiving image data of a portion of the structure into a processing component;

comparing the received damage image data with reference image data for the structure using the processing component;

denoising the received image data based on the comparison of the received image data and the reference image data using the processing component;

automatically identifying one or more anomaly boundaries from the denoised image data using the processing component, at least one of the anomaly boundaries corresponding to damage to the structure;

automatically creating an analysis geometry based on the identified one or more anomaly boundaries using the processing component;

automatically creating an analysis mesh based on the created analysis geometry using the processing component;

automatically performing finite element analysis on the created analysis mesh using the processing component;

comparing the finite element analysis results with allowable results;

calculating the residual strength of the structure;

determining if the structure is suitable for continued service based on at least one of: the results of the finite element analysis; the results of comparing the finite element analysis results with allowable results, and the results of calculating the residual strength of the structure; and outputting the results of the determination of structural suitability for continued service.

* * * * *